US012791051B2

(12) United States Patent
Yu et al.

(10) Patent No.: US 12,791,051 B2
(45) Date of Patent: Nov. 10, 2026

(54) LOW-PROFILE RATTLE MITIGATION TRIM CLIP

(71) Applicant: Tesla, Inc., Austin, TX (US)

(72) Inventors: Yongquan Yu, Kyle, TX (US); Aditya Suresh Murthy, Dublin, CA (US); Aneesh Kaliyanda, San Jose, CA (US); Xuan Yi Lim, San Jose, CA (US); Hugo Ivan Toledo Mendoza, Fremonth, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 18/918,726

(22) Filed: Oct. 17, 2024

(65) Prior Publication Data

US 2026/0110320 A1 Apr. 23, 2026

(51) Int. Cl.
*F16B 21/07* (2006.01)
*B60R 13/02* (2006.01)

(52) U.S. Cl.
CPC ........ *F16B 21/076* (2013.01); *B60R 13/0206* (2013.01)

(58) Field of Classification Search
CPC ........................... F16B 21/076; B60R 13/0206
See application file for complete search history.

(56) References Cited

U.S. PATENT DOCUMENTS 6,431,585 B1 * 8/2002 Rickabus .............. B60R 21/216 280/730.2
10,006,479 B2 * 6/2018 Dickinson ............. F16B 21/076
10,995,783 B2 * 5/2021 Dickinson ............. F16B 5/0657
11,384,784 B2 * 7/2022 Gokavi ................. F16B 21/075
11,773,887 B2 * 10/2023 Dickinson ............. F16B 5/0657 24/289
12,006,966 B2 * 6/2024 Dickinson ............. F16B 21/086
2006/0261695 A1 * 11/2006 Terrill ................... F16F 1/3735 310/91
2007/0274801 A1 * 11/2007 Kidman .............. F16B 19/1072 411/34
2009/0028660 A1 * 1/2009 Csik ...................... F16B 5/0208 411/103
2017/0051780 A1 * 2/2017 Dickinson ............. F16B 21/076
2017/0291558 A1 * 10/2017 Meyers ............... B60R 13/0243
2018/0186305 A1 * 7/2018 Kanie .................... F16B 21/075
2020/0088226 A1 * 3/2020 Dickinson ............. F16B 21/075
2020/0362899 A1 * 11/2020 Takahashi ............... B60R 13/00
2021/0239147 A1 * 8/2021 Gokavi ................. F16B 21/065
2022/0099119 A1 * 3/2022 Dickinson ............... F16B 5/065
2023/0074719 A1 * 3/2023 Lepper .................. F16B 5/0657

* cited by examiner

*Primary Examiner* — David M Upchurch
(74) *Attorney, Agent, or Firm* — Schwegman Lundberg & Woessner, P.A.

(57) ABSTRACT

Examples relate to vehicle trim attachment systems. A trim clip includes a pin, a grommet, and an overmold. An internal snap feature connects the pin and grommet, enabling a compact design. The overmold, made of a soft material like thermoplastic elastomer, covers portions of the assembled pin and grommet to isolate vibrations and mitigate rattles. This configuration allows for a low-profile trim clip that addresses space constraints in vehicle structures while providing secure attachment and noise reduction. The design facilitates easier installation and clip reuse, and offers improved performance compared to traditional trim clips with external snap features.

18 Claims, 6 Drawing Sheets

LOW-PROFILE RATTLE MITIGATION TRIM CLIP

TECHNICAL FIELD

The present disclosure relates to automotive trim attachment systems and, in some examples, to methods and devices for securing interior, exterior, and closure trims (or other components) to vehicle bodies while mitigating rattles and maintaining a low profile.

Some examples are directed to trim clips configured to address challenges in vehicle manufacturing and assembly, for example by combining clip functionality with space efficiency (e.g., low profile), rattle and noise reduction, ease of installation, and enabling trim clip reusability with adequately sustained clip retention force.

BACKGROUND

Vehicle trim attachment systems can play an important role in automotive manufacturing and assembly processes. These systems are responsible for securing various interior, exterior, and closure components to a vehicle body. The field encompasses a wide range of fastening technologies, including clips, snaps, and other attachment mechanisms.

One of the ongoing challenges in this area is the need to balance multiple factors simultaneously. As vehicle designs become more compact and streamlined, manufacturers continually seek to reduce the size of attachment components while maintaining their functionality, particularly maintaining retention force when a clip is reused after trim maintenance or replacement, for example. Vibrations and movement during vehicle operation can lead to unwanted noise from loosely fitting trim components, making noise and rattle reduction an ongoing concern in the industry.

BRIEF SUMMARY

Described examples herein relate to trim clip configurations for securing interior, exterior, and closure trims to vehicle bodies. Example trim clips seek to address several challenges in automotive manufacturing and assembly, including space constraints, noise reduction, and ease of installation. Disclosed examples seek to facilitate efficient assembly processes and allow for straightforward maintenance or replacement of trim and other components. Some examples can withstand various environmental conditions and repeated use over a vehicle's lifetime, and work effectively with a variety of materials used in modern vehicle construction, including metals, plastics, and composites.

Some example trim clips of this disclosure comprise multiple components working together to provide a secure attachment while mitigating rattles and allowing repeated use. Generally speaking, the main clip components include a pin, a grommet, and an overmold.

In some examples, the pin serves as a primary fastening element. An example pin is configured to engage with a vehicle body hole and provide secure and repeatable trim retention force. In some examples, a pin may have specific features to enhance its gripping capability or allow for reuse and/or adjustments during installation.

In some examples, the grommet interfaces between the pin and the vehicle body hole, providing a secure fit and helping to distribute load. In some examples, the grommet is made of a material that offers some degree of flexibility, allowing it to conform to slight variations in hole size or shape. In some examples, one or more resilient external snap features on the grommet secure the trim clip in a vehicle hole. In some examples, an external snap feature can deform inwardly when passed through a vehicle hole to secure a piece of trim to a body panel for example and, on completing passage through the hole, snap back to be secured behind a surface of the panel adjacent the hole.

A notable feature of the present trim clips, in particular the grommet, is the incorporation of one or more internal snap features. In some examples, these internal snap features join or connect the pin and grommet and allow for a more compact design compared to traditional clips that conventionally utilize external snap features alone. The internal configuration of some present examples contributes significantly to a space-efficient, low-profile nature of the clips, addressing the challenge of limited packaging space in modern vehicle designs. In some examples, one or more internal snap features also enable significant and sustained clip retention force, even when the clip is reused.

In some examples, the overmold contributes to noise and rattle mitigation. Some example overmolds include or are made from a soft material, such as a thermoplastic elastomer (TPE). A soft overmold serves to isolate and dampen vibrations, reducing the likelihood of rattles developing over time. In some examples, a soft overmold creates a buffer between the harder components of the clip and the vehicle body, absorbing minor movements and vibrations that might otherwise generate noise.

An example assembly process of the present trim clips includes bringing together the pin, grommet, and overmold components. The internal snap features seek to facilitate this assembly, allowing for a secure connection between the parts while maintaining a compact overall profile and maintaining adequate retention force when the trim clip is reused.

BRIEF DESCRIPTION OF THE DRAWINGS

Throughout the drawings, reference numbers may be re-used to indicate correspondence between referenced elements. The drawings are provided to illustrate examples of the subject matter described herein and not to limit the scope thereof.

DETAILED DESCRIPTION

Figure 1A:
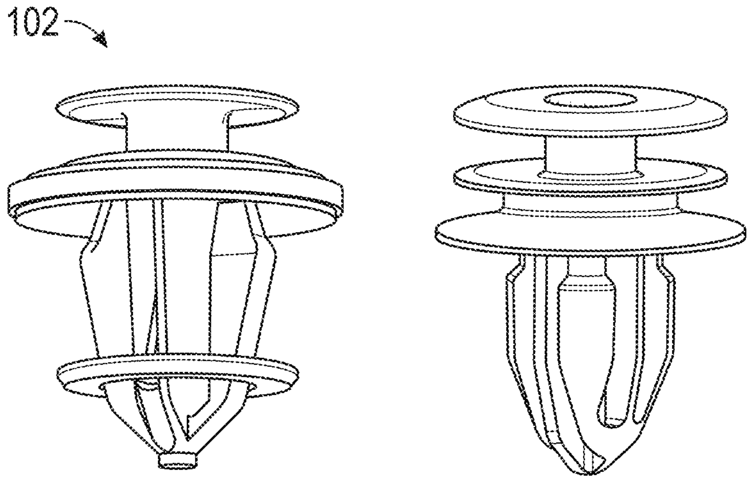
FIG. 1A Prior Art
FIG. 1A illustrates an example traditional single piece trim clip.

FIG. 1A is a pictorial view of an example traditional single piece trim clip 102. This type of trim clip is intended for one-time use only. The clip needs to replaced by a fresh clip after each service or use. There is a significant if not complete degradation of retention force if the same clip is used again.

Figure 1B:
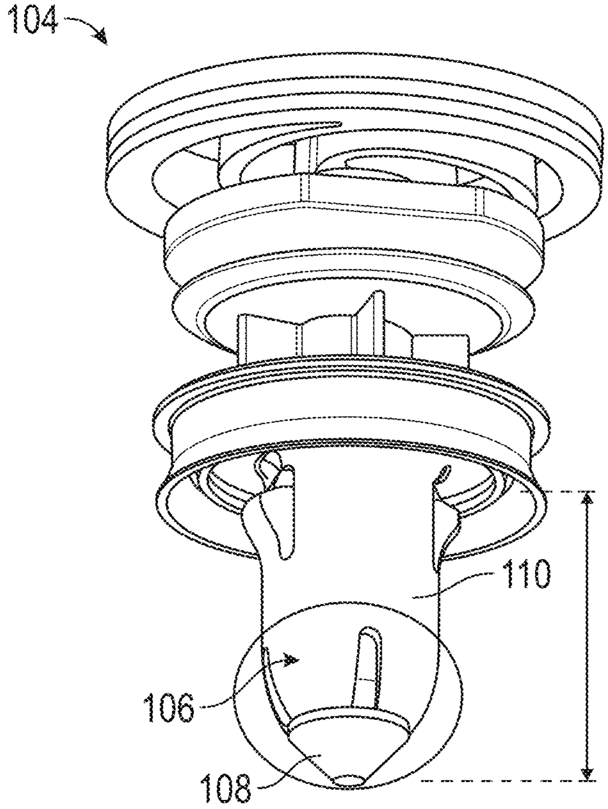
FIG. 1B Prior Art
FIG. 1B illustrates an example traditional assembly type trim clip.

FIG. 1B is a pictorial view of another traditional trim clip. This type is known as an assembly type trim clip 104. This type of trim clip has an external snap feature 106 between the pin 108 and the grommet 110. The outside position of the external snap feature 106 causes the assembly type trim clip 104 to adopt a relatively long configuration, for example as shown. This long length is not always helpful. Vehicle space may be wasted and trim portions of the vehicle may suffer from poor aesthetic appeal if the underside of the long assembly type trim clip 104 is visible. The single piece trim clip 102 and the assembly type trim clip 104 of FIG. 1A and FIG. 1B include no internal snap features.

Figure 3:
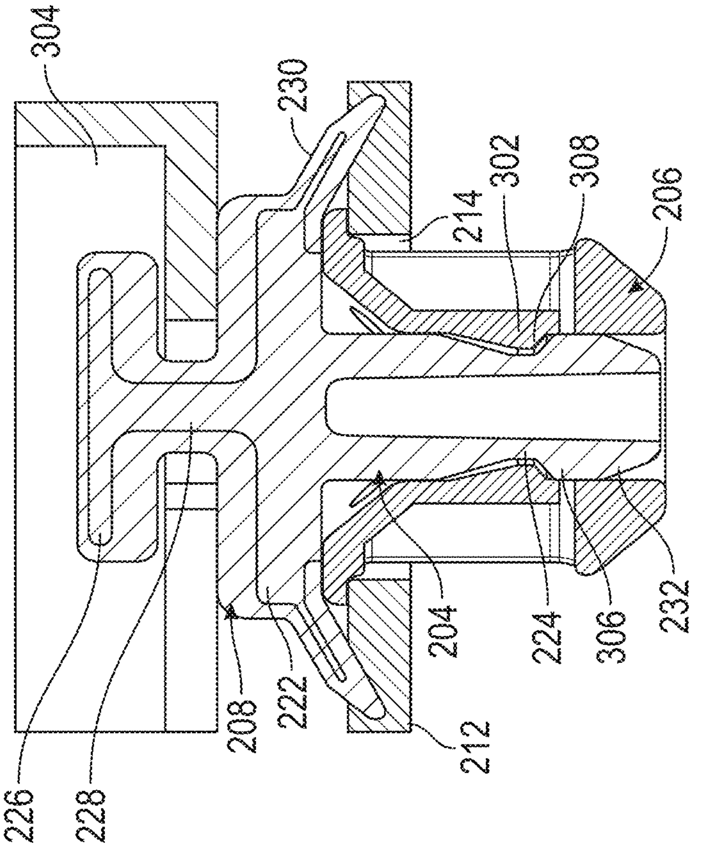
FIG. 3 is a sectional view generally corresponding to FIG. 2, showing internal details of the trim clip components.
Figure 2:
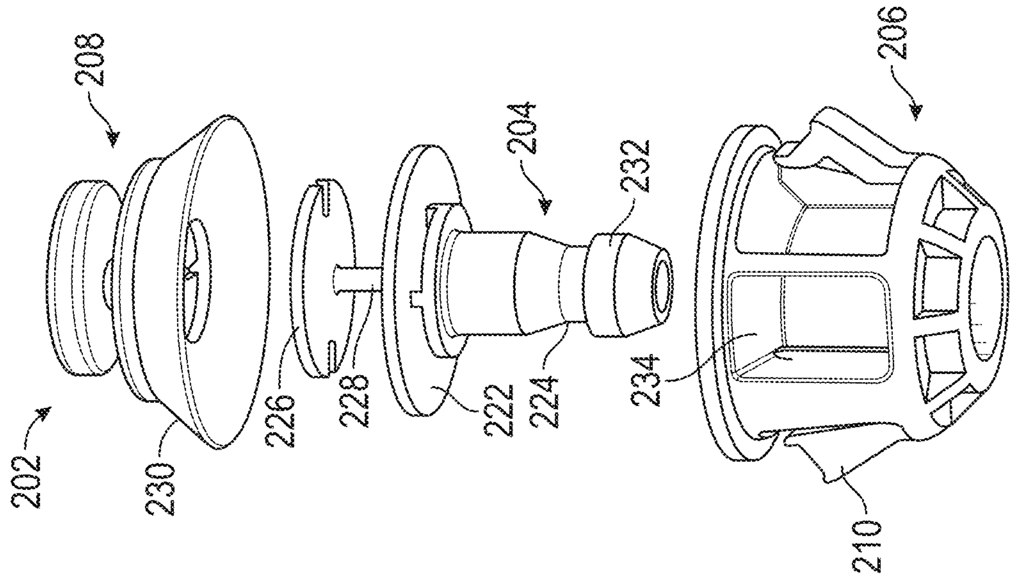
FIG. 2 is a pictorial view showing example components of a trim clip according to the present disclosure.

FIG. 2 on the other hand is a pictorial view showing example components of a trim clip 202 of the present disclosure. The illustrated clip components include a pin 204, a grommet 206, and an overmold 208 (also known as a soft piece). These components are shown in generally corresponding sectional view in FIG. 3 shown just adjacent FIG. 2 for case of explanation and clarity.

In some examples, the pin 204 is formed of a rigid plastic material, such as nylon with glass fiber reinforcement. In some examples, the grommet 206 is also composed of a rigid plastic material. In some examples, the overmold 208 is overmolded onto the pin 204 using a soft thermoplastic elastomer (TPE) material, for example. Other configurations and materials of these components are possible.

Figure 4:
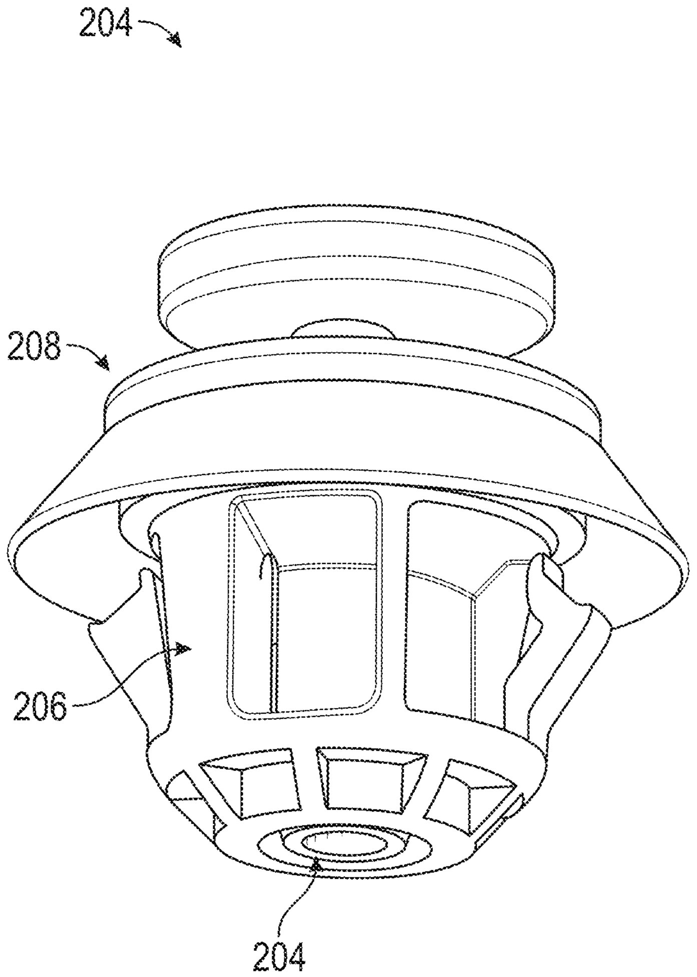
FIG. 4 is another view of the trim clip components.

In the illustrated example, the pin 204 includes a disc-shaped main head 222 that supports a similarly shaped auxiliary head 226 mounted on an extension piece 228 as shown. The main head 222 and auxiliary head 226 fit inside and engage with corresponding volumes in the overmold 208 securely so that the overmold 208 sits securely on the pin 204, for example as shown in FIG. 3 and FIG. 4. The extension piece 228 provides a space between the main head 222 and the auxiliary head 226 to accept a trim component 304, for example as shown in FIG. 3. The soft material of the overmold 208 dampens the held trim component 304 and seeks to isolate this trim component 304 in substantially vibration free manner from a body panel 212 to which the trim component 304 is to be secured.

The overmold 208 is overmolded onto the head of the pin 204. It includes a mushroom-shaped profile that extends radially beyond the diameter of the pin shaft. The overmold 208 functions to isolate vibration and reduce noise transmission between a vehicle body panel 212 and a trim component 304 secured by the trim clip 202. The deep engagement between the corresponding volumes in the mushroom-shaped overmold 208 and the radially expansive disc-shaped engagement features of the main head 222 and the auxiliary head 226 assist in providing a strong and secure retention force for the trim component 304 secured by the trim clip 202. The overmold 208 is unlikely to escape or work free from the pin 204 even during severe vibration. This secure retention may also assist in reducing rattle and noise. Additionally, the broad surfaces 230 and large circumference presented by the soft mushroom-shaped overmold 208 may assist in spreading load and stresses, and in dampening vibration in some examples.

The pin 204 further includes a cone-shaped or annular recess 224 and one or more grommet-engagement protrusions 306 defined by a pin end bulb 232, for example as shown. These features are described in more detail below as part of an internal snap mechanism providing a notable space-saving feature of the present trim clip 202.

Figure 6A:
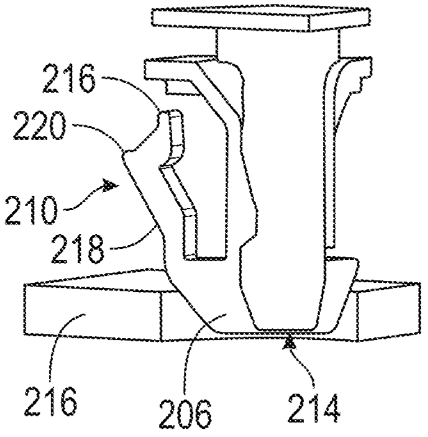
FIG. 6A to FIG. 6D show detailed views of an example insertion and withdrawal process for the trim clip.
Figure 6B:
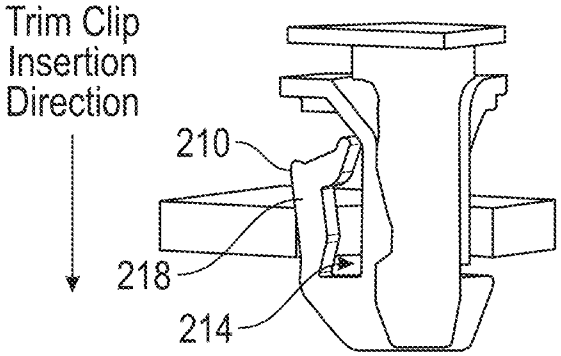
Figure 6C:
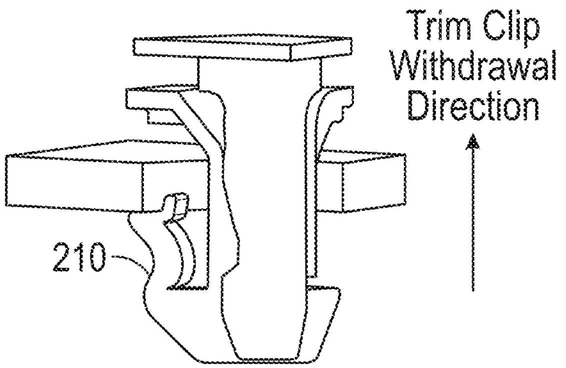
Figure 6D:
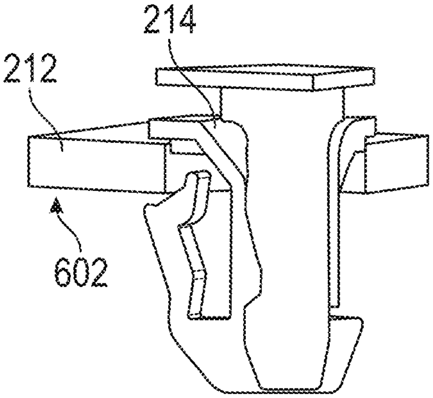

The grommet 206 of the trim clip 202 includes one or more external snap features 210 configured to engage with a vehicle body panel 212 for example as shown in FIG. 6D. In the views of FIG. 3 and FIG. 6D, the trim clip 202 is shown inserted into a vehicle hole 214 to connect and secure a trim component 304 (FIG. 3) to a vehicle body panel 212, for example. As shown in FIG. 6A through FIG. 6D, these external snap features 210 can deform radially inwardly (see for example the view of FIG. 6A compared with the view of FIG. 6B) during initial insertion of the trim clip 202 (specifically, the grommet 206) into the hole 214 hole in the body panel 212. Upon further insertion of the trim clip 202, the external snap features 210 expand outwardly to lock behind the body panel 212 (see for example FIG. 6D).

The external snap feature 210 includes a tip 216 that engages a surface 602 of the body panel 212 adjacent the hole 214 when the trim clip 202 is fully inserted. Radial inward deformation of the external snap feature 210 is induced during an initial insertion phase of the trim clip 202 by a camming surface 218 acting against the walls of the hole 214 (see again FIG. 6B, for example). With reference to FIG. 6C, if the trim clip 202 experiences severe vibration in use, such that it is partially withdrawn for example, the external snap feature 210 bends or deforms to bring a flat shoulder 220 of the trim clip 202 into engagement with the under surface 602 to assist the tip 216 in generating a retraction force.

As mentioned above, the grommet 102 also contains one or more internal snap features 302 within its central cavity. The one or more internal snap features 302 engage releasably with the recess 224 and one or more protrusions 306 provided on the end bulb 232 of the pin 204. The internal snap features 302 can deform radially outwardly over the end bulb 232 and radially inwardly into the recess 224 upon axial movement of the pin 204 to place latching formations 308 of the internal snap features 302 into engagement with the protrusions 306 of the end bulb 232. In some examples, the internal snap feature 302, or at least a portion or profile of the internal snap feature 302, is defined by a depression 234 formed in the body of the grommet 206. The depression 234 may be formed during molding of the grommet 206, for example. In some examples, one or more such depressions 234 may be formed. In some examples, the depressions 234 are spaced equally around the body of the grommet 206. In some examples, two, or three, or four depressions 234 may be provided. In some examples, the grommet 206 includes multiple internal snap features 302, with at least one on each side of the central cavity. This configuration of internal snap features 302 provides a balanced and secure connection between the pin 204 and the grommet 206 while maintaining the low-profile design of the trim clip 202. In sum, this internal snap mechanism allows the trim clip 202 to be removably secured within the grommet 206 while maintaining a low overall profile for the assembled trim clip 202.

Some instances of servicing or replacing a trim component 304 comprises simply removing the pin 204 from the grommet 206 while leaving the grommet 206 secured to the vehicle body panel 212. Some examples further comprise reinserting the pin 204 into the grommet 206 after servicing or replacing the trim component 304. The external snap features 210 keep the grommet 206 securely fastened in the body panel 212 during the servicing or replacement of the trim component 304. The interaction of the internal snap features 302 of the grommet 206 with the pin 204 facilitate convenient removal and reinsertion of the pin 204.

This trim clip 202 configuration seeks to facilitate serviceability, as the pin 204 can be removed and reinserted multiple times without significantly degrading the retention force of the grommet 206 in a significant manner. The internal snap mechanism maintains a low profile compared to traditional external snap designs, addressing packaging constraints in certain vehicle applications.

In some examples, when a complete retraction or removal of the grommet 206 is desired, the pin 204 is first extracted from the grommet 206 and the grommet 206 is urged from the hole 214. The upward withdrawal movement of the grommet 206 out of the hole 214 brings the flat shoulder 220 into contact with the under surface 602 adjacent the hole 214 and induces a bending of the external snap feature 210, as shown for example in FIG. 6C. During further withdrawal of the grommet 206, the flat shoulder 220 rotates from a generally horizonal plane (for example as shown in FIG. 6B), through a generally inclined plane (for example as shown in FIG. 6C), to a generally vertical plane (not shown) at which point the tip 216 and flat shoulder 220 can be withdrawn in sliding manner upwardly through the hole 214 so that the trim clip 202 is released from the body panel 212.

Figures 5A, 5B, 5C, 5D:
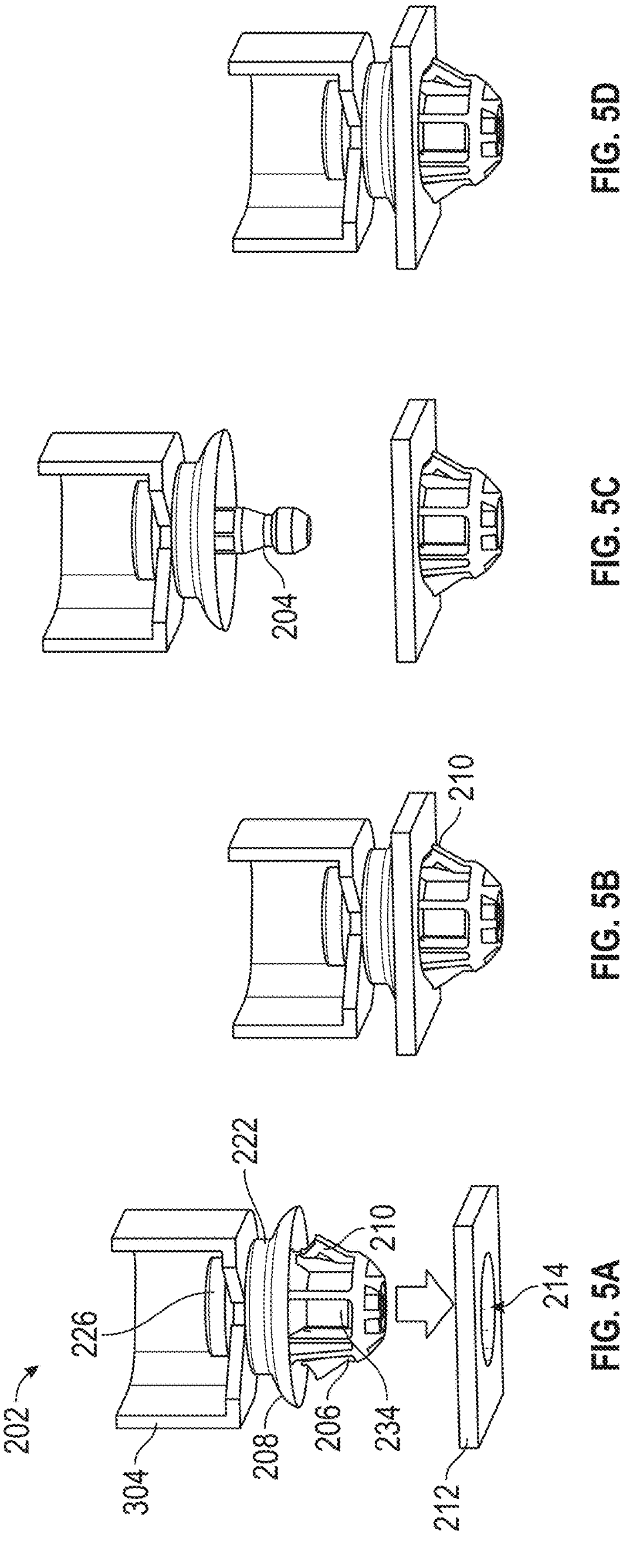
FIG. 5A to FIG. 5D illustrate a sequence of operations for inserting a trim clip into a hole in a body panel to secure a trim component.

A procedure for inserting a trim clip 202 into a hole 214 in a body panel 212 can be seen with reference to FIG. 5A to FIG. 5D. The trim clip 202 can be used for example to secure a trim component 304 to the body panel 212. In FIG. 5A, the trim component 304 is positioned between the main head 222 and the auxiliary head 226 head of the pin 204 prior to inserting the 204 into the grommet 206. The pin 204 with attached soft overmold 208 is inserted into the grommet 206 to engage the internal snap features 302 discussed above. The grommet 206 is then inserted into the hole 214 in the vehicle body panel 212. In some examples, the grommet 206 is inserted into the hole 214 prior to positioning the trim component 304 between the main head 222 and the auxiliary head 226.

In FIG. 5B, the external snap features 210 secure the grommet 206 in place and generate a retention force securing the grommet 206 to the body panel 212, and secure the trim component 304 thereto. Example ranges and values of the retention force are discussed in more detail further below.

In FIG. 5C, servicing or replacing the trim component 304 comprises simply removing the pin 204 from the grommet 206 while leaving the grommet 206 secured to the vehicle body panel 212. Some examples further comprise reinserting the pin 204 into the grommet 206 after servicing or replacing the trim component 304. The external snap features 210 keep the grommet 206 securely fastened in the body panel 212 during the servicing or replacement of the trim component 304. The interaction of the internal snap features 302 of the grommet 206 with the pin 204 facilitate convenient removal and reinsertion of the pin 204.

In FIG. 5D, the pin 204 with attached soft overmold 208 and serviced or replaced trim component 304 is shown reinserted into the grommet 206 to engage the internal snap features 302 discussed above to lock the reused trim clip 202 into the hole 214.

As mentioned above, the example trim clip 202 configuration seeks to facilitate serviceability, as the pin 204 can be removed and reinserted multiple times without significantly degrading the retention force of the grommet 206 in a significant manner. The internal snap mechanism maintains a low profile compared to traditional external snap designs, addressing packaging constraints in certain vehicle applications.

In some examples of a trim clip 202 herein described, an insertion force generally refers to a force required to insert a component into its mating part. In some examples, there are two relevant insertion forces: in a first instance, the force needed to insert a grommet 206 into a body panel 212 (also referred to as insertion force F1 in some examples) and, in a second instance, the force required to insert a pin 204 into a grommet 206 (also referred to as insertion force F3 in some examples). In some examples of a trim clip 202, the insertion force F1 is in a range of 20 Newtons (N) to 50 N, and in some examples is in a range of 25 N to 40 N, and in a specific example is approximately 31 N. In some examples, the insertion force F3 is in a range of 2 N-20 N, and in some examples is in a range of 5 N to 15 N, and in a specific example is approximately 7 N.

In some examples of a trim clip 202 herein described, a retention force generally refers to a force required to remove a component from a panel. In some examples, a retention force (also referred to as retention force F2 in some examples) refers to the force required to remove a grommet 206 secured in a hole 214 for example from a body panel 212. In some examples, this retention force ensures that the grommet 206 remains firmly attached to the vehicle structure, even if a trim clip 202 is reused. In some examples of a trim clip 202, the retention force F2 for a new or reused trim clip 202 is in a range of 50 N to 450 N, and in some examples is in a range of 100 N to 300 N, and in a specific example is approximately 243 N.

In some examples of a trim clip 202 herein described, a removal force refers to the force required to separate or extract a component from its mating part. In some examples, the removal force (also referred to as removal force F4 in some examples) refers to the force required to remove a pin 204 from a grommet 206. This removal force can also be an aspect allowing serviceability of a component (such as a trim component 304) and reusability of a trim clip 202 while maintaining a secure connection during normal use of the vehicle. In some examples of a trim clip 202, the removal force F4 for a new or reused trim clip 202 is in a range of 100 N to 300 N, and in some examples is in a range of 125 N to 200 N, and in a specific example is approximately 152 N.

Other examples ranges and specific values of F1, F2, F3, and F4 are possible. In some examples, these forces play a contributory and/or complementary role in the functionality of the trim clip 202, seeking to provide convenient assembly of a trim clip 202, secure attachment of a trim component 304 to a body panel 212 (for example), and an ability to service a trim component 304 and reuse a trim clip 202 if desired.

Figure 7:
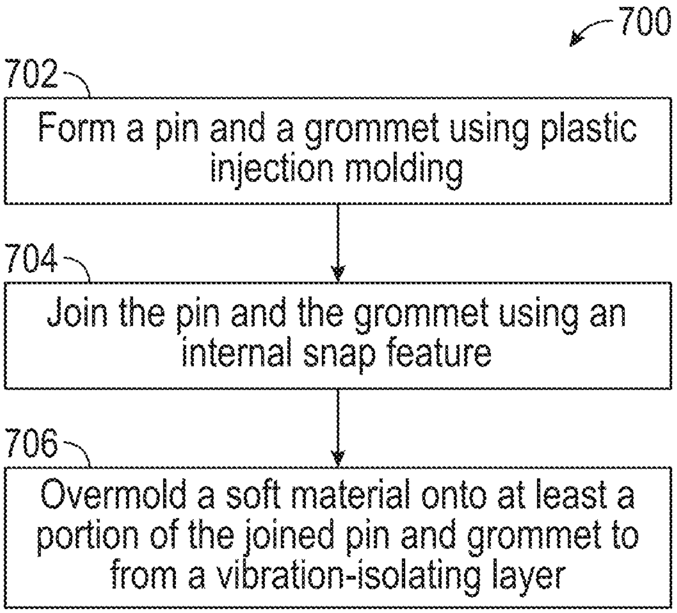
FIG. 7 is a flowchart illustrating an example method of manufacturing a low-profile trim clip.

Some examples herein include methods. With reference to FIG. 7, a flowchart describing example operations in a method 700 of manufacturing a low-profile trim clip is provided. In operation 702, method 700 forms a pin and a grommet using plastic injection molding. In operation 704, method 700 joins the pin and the grommet using an internal snap feature. In operation 706, method 700 overmolds a soft material onto at least a portion of the joined pin and grommet to form a vibration-isolating layer.

In some examples, joining the pin and the grommet includes creating multiple internal snap features on opposite sides of a central cavity of the grommet. In some examples, forming the pin includes using nylon with glass fiber reinforcement. The method may further include creating physical bonding features on the pin to improve retention of the overmold. In some examples, overmolding the soft material includes creating a mushroom-shaped profile that extends radially beyond the diameter of the pin shaft to assist in spreading load and dampening vibration. Other technical features may be readily apparent to one skilled in the art from the following figures, descriptions, and claims.

Figure 8:
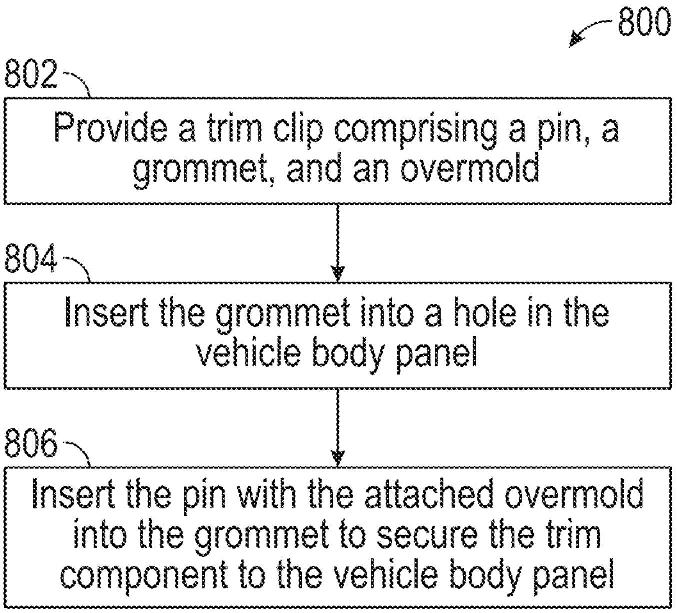
FIG. 8 is a flowchart illustrating an example method of attaching a trim component to a vehicle body panel.

With reference to FIG. 8, a flowchart describing example operations in method 800 of attaching a trim component to a vehicle body panel is provided. In operation 802, method 800 provides a trim clip comprising a pin, a grommet, and an overmold. In operation 804, method 800 inserts the grommet into a hole in the vehicle body panel. In operation 806, method 800 inserts the pin with the attached overmold into the grommet to secure the trim component to the vehicle body panel.

In some examples, inserting the grommet into the hole comprises deforming one or more external snap features on the grommet radially inward as the grommet passes through the hole; and allowing the one or more external snap features to expand radially outward after passing through the hole to lock behind the vehicle body panel.

In some examples, inserting the pin into the grommet comprises engaging one or more internal snap features within the grommet with corresponding features on the pin to secure the pin within the grommet.

In some examples, inserting the grommet into the hole comprises applying an insertion force in a range of 20 N to 50 N, or 25 N to 40 N, or approximately 31 N.

In some examples, inserting the pin into the grommet comprises applying an insertion force in a range of 2 N to 20 N, or 5 N to 15 N, or approximately 7 N.

In some examples, the method 800 further comprises positioning the trim component between a main head and an auxiliary head of the pin prior to inserting the pin into the grommet.

In some examples, the overmold comprises a soft material that isolates vibration between the vehicle body panel and the trim component.

In some examples, the method 800 further comprises removing the pin from the grommet for servicing or replacing the trim component while leaving the grommet secured to the vehicle body panel.

In some examples, the method 800 further comprises reinserting the pin into the grommet after servicing or replacing the trim component.

Although the described flow diagrams of FIG. 7 and FIG. 8 can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems.

A manufacturing process for the present trim clips may include plastic injection molding. In some examples, this method allows for the production of complex shapes and features with high precision. The use of plastic materials may offer benefits in terms of weight reduction, cost-effectiveness, and design flexibility. In some examples, plastic overmolding techniques may be employed to integrate the softer, vibration-dampening components with the more rigid structural elements of the clip.

In some examples, the pin 204 is formed of a rigid plastic material, such as nylon with glass fiber reinforcement. This material composition provides appropriate strength and rigidity for the pin's function. In some examples, the overmold 208 is securely attached to the pin 204 through physical bonding features. These features may include specially designed surfaces or structures on the pin 204 that interlock with the overmolded material, creating a strong mechanical bond that prevents separation of the overmold 208 from the pin 204 even under severe vibration or repeated use.

In some examples, the trim clip 202 is designed to provide the following force ranges seeking to balance ease of installation and clip reusability with secure retention:

| Force Type | Range |
|---|---|
| F1 (Insertion force, grommet to body panel) | 20N to 50N, specifically 25N to 40N |
| F2 (Retention force, grommet from body panel) | 50N to 450N, specifically 100N to 300N |
| F3 (Insertion force, pin to grommet) | 2N to 20N, specifically 5N to 15N |
| F4 (Removal force, pin from grommet) | 100N to 300N, specifically 125N to 200N |

In some examples, the trim clip 202 is designed to provide specific force characteristics that seek to balance ease of installation and clip reusability with secure retention. In some examples, the insertion force F1 required to insert the grommet 206 into a body panel 212 is approximately 31 N. The insertion force F3 required to insert the pin 204 into the grommet 206 is approximately 7 N. The retention force F2 required to remove the grommet 206 from the body panel 212 is approximately 243 N, while the removal force F4 required to extract the pin 204 from the grommet 206 is approximately 152 N. These specific force values may contribute to the clip's functionality, allowing for convenient assembly, secure attachment, and serviceability.

The following table summarizes the specific force characteristics described above.

| Force Type | Description | Value |
|---|---|---|
| F1 | Insertion force (grommet to body panel) | 31N |
| F2 | Retention force (grommet from body panel) | 243N |
| F3 | Insertion force (pin to grommet) | 7N |
| F4 | Removal force (pin from grommet) | 152N |

In some examples, the design and performance characteristics of the trim clip 202 were optimized using Finite Element Analysis (FEA) studies. These studies helped determine the optimal geometries and material properties to achieve the desired force characteristics and structural integrity of the clip components. The use of FEA in the design process contributed to the development of a trim clip that effectively balances the requirements for ease of installation, secure retention, and noise and vibration mitigation.

While a primary application of the present trim clips may be found in automotive manufacturing, the underlying principles and technologies could be adapted for use in other industries where secure, low-profile, and rattle-free attachments are desired, for example including applications in aerospace, appliance manufacturing, or other sectors of transportation and industrial design.

EXAMPLES

Some examples of the present disclosure may include one or more of the following examples.

Example 1 is a trim clip for attaching vehicle trim, comprising: a pin configured to engage with a trim component; a grommet configured to interface between the pin and a vehicle body hole; an overmold including a soft material for isolating vibration; and an internal snap feature configured to join the pin and the grommet.

Example 2 includes the subject matter of Example 1 wherein the overmold is made of thermoplastic elastomer (TPE).

Example 3 includes the subject matter of Examples 1-2 wherein the pin is formed of a rigid plastic material comprising nylon with glass fiber reinforcement.

Example 4 includes the subject matter of Examples 1-3 wherein the grommet comprises one or more external snap features configured to engage with a vehicle body panel.

Example 5 includes the subject matter of Examples 1-4 wherein the internal snap feature comprises multiple internal snap features positioned on opposite sides of a central cavity of the grommet.

Example 6 includes the subject matter of Examples 1-5 wherein the pin comprises a disc-shaped main head and an auxiliary head mounted on an extension piece, the main head and auxiliary head configured to securely engage with corresponding volumes in the overmold.

Example 7 includes the subject matter of Examples 1-6 wherein the grommet of a new or reused trim clip is configured to be inserted into a vehicle body hole with an insertion force in a range of 20 N to 50 N, or 25 N to 50 N.

Example 8 includes the subject matter of Examples 1-7 wherein the pin is configured to be inserted into the grommet with an insertion force in a range of 2 N to 50 N.

Example 9 includes the subject matter of Examples 1-8 wherein the overmold comprises a mushroom-shaped profile that extends radially beyond the diameter of the pin shaft.

Example 10 includes the subject matter of Examples 1-9 wherein the pin comprises a cone-shaped or annular recess and one or more grommet-engagement protrusions defined by a pin end bulb.

Example 11 is a method of manufacturing a low-profile trim clip, comprising: forming a pin and a grommet using plastic injection molding; joining the pin and the grommet using an internal snap feature; and overmolding a soft material onto at least a portion of the joined pin and grommet to form a vibration-isolating layer.

Example 12 includes the subject matter of Example 11 wherein joining the pin and the grommet comprises creating multiple internal snap features on opposite sides of a central cavity of the grommet.

Example 13 includes the subject matter of Examples 11-12 wherein forming the pin comprises using nylon with glass fiber reinforcement.

Example 14 includes the subject matter of Examples 11-13 further comprising creating physical bonding features on the pin to improve retention of the overmold.

Example 15 includes the subject matter of Examples 11-14 wherein overmolding the soft material comprises creating a mushroom-shaped profile that extends radially beyond the diameter of the pin shaft to assist in spreading load and dampening vibration.

Example 16 is a vehicle trim attachment system, comprising: a trim clip including a pin; a grommet; an internal snap feature connecting the pin and the grommet; and a vibration-isolating overmold covering at least a portion of the connected pin.

Example 17 includes the subject matter of Example 16 wherein the grommet is configured to be retained in a vehicle body panel with a retention force in a range of 50 N to 450 N, or 100 N to 300 N, or approximately 243 N.

Example 18 includes the subject matter of Examples 16-17 wherein the pin is configured to be removed from the grommet with a removal force in a range of 100 N to 300 N, or 125 N to 200 N, or approximately 152 N.

Example 19 includes the subject matter of Examples 16-18 wherein the grommet comprises one or more external snap features configured to deform radially inwardly during insertion into a vehicle body hole and expand outwardly to lock behind a body panel.

Example 20 includes the subject matter of Examples 16-19 wherein the internal snap feature comprises latching formations configured to engage with protrusions on an end bulb of the pin.

Example 21 includes the subject matter of Examples 16-20 wherein the grommet comprises one or more depressions formed during molding to define at least a portion of the internal snap feature.

Example 22 includes a vehicle trim attachment system comprising: a trim clip including a pin, a grommet, and an overmold; wherein the pin is formed of a rigid plastic material comprising nylon with glass fiber reinforcement; wherein the grommet comprises one or more external snap features configured to engage with a vehicle body panel and one or more internal snap features configured to engage with the pin; wherein the overmold is made of thermoplastic elastomer (TPE) and covers at least a portion of the pin to isolate vibration; and wherein the internal snap features allow for a compact assembly of the pin and grommet within the overmold, facilitating installation in limited packaging spaces within a vehicle structure while providing rattle mitigation.

Example 23 includes a method of attaching vehicle trim, comprising: inserting a grommet of a trim clip into a hole in a vehicle body panel with an insertion force of approximately 31 N, wherein the grommet comprises one or more external snap features that secure the grommet in place; inserting a pin with an attached soft overmold into the grommet with an insertion force of approximately 7 N, wherein the pin engages with one or more internal snap features of the grommet to lock the trim clip into the hole; and wherein the soft overmold isolates vibration between the vehicle body panel and a trim component secured by the trim clip.

Example 24 includes a reusable vehicle trim clip system, comprising: a pin configured to engage with a trim component; a grommet configured to interface between the pin and a vehicle body hole; an overmold including a soft material for isolating vibration; one or more internal snap features joining the pin and the grommet; wherein the grommet is configured to be retained in a vehicle body panel with a retention force of approximately 243 N; wherein the pin is configured to be removed from the grommet with a removal force of approximately 152 N; and wherein the system allows for multiple removals and reinsertions of the pin for servicing the trim component while maintaining the grommet secured to the vehicle body panel.

While the above is a detailed description of some examples of the inventive subject matter, various alternatives, modifications, and equivalents may be used. Therefore, the above description should not be taken as limiting the scope of the inventive subject matter which is defined by the appended claims.

What is claimed is:

1. A trim clip for attaching a vehicle trim component to a vehicle body panel, the trim clip comprising:

a pin configured to engage with the trim component, the pin including a head and an end bulb defining a pin recess and one or more protrusions;

a grommet configured to interface between the pin and a hole in the body panel, the grommet including a central cavity and one or more external snap features configured to deform radially inwardly upon insertion into the hole, and deform radially outwardly after insertion to secure the grommet therein;

an overmold, overmolded over the head of the pin and fixedly secured thereto, the overmold including a soft material for dampening vibration between the trim component and the body panel; and an internal snap feature defined in a body of the grommet and configured to releasably join the pin and the grommet, the internal snap feature including a latching formation projecting from an inner wall of the central cavity, the latching formation configured to deform radially outwardly over the end bulb and radially inwardly into the recess to place the latching formation into engagement with the one or more protrusions of the end bulb, wherein at least a portion of the internal snap feature is formed or located in a depression in an outer wall of the body of the grommet.

2. The trim clip of claim 1, wherein the overmold is made of thermoplastic elastomer (TPE).

3. The trim clip of claim 1, wherein the pin is formed of a rigid plastic material comprising nylon with glass fiber reinforcement.

4. The trim clip of claim 1, wherein the one or more external snap features are configured to engage with a vehicle body panel.

5. The trim clip of claim 1, wherein the internal snap feature comprises multiple internal snap features positioned on opposite sides of a central cavity of the grommet.

6. The trim clip of claim 1, wherein the pin comprises a main head and an auxiliary head mounted on an extension piece, the main head and auxiliary head configured to securely engage with corresponding volumes in the overmold.

7. The trim clip of claim 1, wherein the grommet of a new or reused trim clip is configured to be inserted into the hole with an insertion force in a range of 20N to 50N.

8. The trim clip of claim 1, wherein the pin is configured to be inserted into the grommet with an insertion force in a range of 2N to 50N.

9. The trim clip of claim 1, wherein the overmold comprises a mushroom-shaped profile that extends radially beyond a diameter of the pin.

10. The trim clip of claim 1, wherein the pin comprises a cone-shaped or annular recess and one or more grommet-engagement protrusions defined by a pin end bulb.

11. A vehicle trim attachment system, comprising:

a trim clip including:

a pin including a head and an end bulb defining a pin recess and one or more protrusions;

a grommet insertable into a hole, the grommet including a central cavity;

an internal snap feature defined in a body of the grommet and configured to releasably connect the pin and the grommet, wherein at least a portion or profile of the internal snap feature is defined by or formed in a depression in an outer wall of the body of the grommet, the internal snap feature including a latching formation projecting from an inner wall of the central cavity, the latching formation configured to deform radially outwardly over the end bulb and radially inwardly into the recess to place the latching formation into engagement with the one or more protrusions of the end bulb, the grommet further including one or more external snap features configured to deform radially inwardly upon insertion into the hole, and deform radially outwardly after insertion to secure the grommet therein; and a vibration-dampening overmold, overmolded over the head of the pin and fixedly secured thereto, covering at least a portion of the connected pin and the grommet.

12. The vehicle trim attachment system of claim 11, wherein the grommet is configured to be retained in a vehicle body panel with a retention force in a range of 50N to 450N, or 100N to 300N, or approximately 243N.

13. The vehicle trim attachment system of claim 11, wherein the pin is configured to be removed from the grommet with a removal force in a range of 100N to 300N, or 125N to 200N, or approximately 152N.

14. The vehicle trim attachment system of claim 11, wherein the internal snap feature comprises latching formations configured to engage with protrusions on an end bulb of the pin.

15. The vehicle trim attachment system of claim 11, wherein the grommet comprises one or more depressions formed during molding to define at least a portion of the internal snap feature.

16. The trim clip of claim 1, wherein the grommet provides primary retention force for securing the trim clip to the hole through the one or more external snap features independently of retention features of the pin.

17. The trim clip of claim 1, wherein the overmold that is overmolded over the head of the pin is configured to be inserted into or engage with a hole or recess in the trim component.

18. The trim clip of claim 6, wherein the overmold including corresponding volumes engaged with the main head and the auxiliary head is configured to be inserted into or engage with a hole or recess in the trim component.

* * * * *